US012455189B2

(12) United States Patent
Cho et al.

(10) Patent No.: US 12,455,189 B2
(45) Date of Patent: Oct. 28, 2025

(54) SPECTRAL DEVICE WITH ENHANCED STABILITY OF OPTICAL SENSOR AND OPERATING METHOD THEREOF

(71) Applicant: ELECTRONICS AND TELECOMMUNICATIONS RESEARCH INSTITUTE, Daejeon (KR)

(72) Inventors: Won Bae Cho, Daejeon (KR); Seung Hwan Kim, Daejeon (KR); Jeong Won Park, Daejeon (KR); Chul Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 218 days.

(21) Appl. No.: 17/993,145

(22) Filed: Nov. 23, 2022

(65) Prior Publication Data
US 2023/0204416 A1  Jun. 29, 2023

(30) Foreign Application Priority Data

Dec. 27, 2021 (KR) .................. 10-2021-0188907
Oct. 6, 2022 (KR) .................. 10-2022-0127649

(51) Int. Cl.
G01J 3/02 (2006.01)

(52) U.S. Cl.
CPC .......... *G01J 3/0232* (2013.01); *G01J 3/0208* (2013.01)

(58) Field of Classification Search
CPC ........ G01J 3/0232; G01J 3/0208; G01J 3/021; G01J 3/08; G01J 3/42
See application file for complete search history.

(56) References Cited

U.S. PATENT DOCUMENTS

| 7,424,180 B2 | 9/2008 | Park et al. |
| 2003/0053744 A1 | 3/2003 | Makio |
| 2008/0231830 A1 | 9/2008 | Osada |
| 2010/0103490 A1* | 4/2010 | Noguchi ............ G11B 7/0065 359/30 |
| 2010/0157295 A1 | 6/2010 | Ko et al. |

(Continued)

FOREIGN PATENT DOCUMENTS

| JP | H10-108857 A | 4/1998 |
| JP | 2008-232881 A | 10/2008 |

(Continued)

Primary Examiner — Tarifur R Chowdhury
Assistant Examiner — Carlos Perez-Guzman
(74) Attorney, Agent, or Firm — LRK PATENT LAW FIRM

(57) ABSTRACT

Disclosed herein a spectral device with enhanced stability of optical sensor and an operating method of the device. According to an embodiment of the present disclosure, there is provided a spectral device including: a light splitter configured to split an incident light into a reference light and a signal light; at least one beam shutter configured to perform control for selectively outputting at least one of the reference light and the signal light and for blocking the two signals together; and a controller configured to provide an absorption property of a bio-material by comparatively quantizing an intensity of the reference light and an intensity of the signal light, which are received into a sensor through the beam shutter.

3 Claims, 10 Drawing Sheets

(56) References Cited

U.S. PATENT DOCUMENTS

| | | | |
|---|---|---|---|
| 2011/0058175 A1 | 3/2011 | Suehira | |
| 2017/0334220 A1* | 11/2017 | Tatsuda | B41J 13/0009 |
| 2018/0011177 A1 | 1/2018 | Sugiura et al. | |
| 2022/0341785 A1* | 10/2022 | Akagawa | G01N 21/35 |
| 2023/0014558 A1* | 1/2023 | Sabry | G01J 3/0259 |

FOREIGN PATENT DOCUMENTS

| | | |
|---|---|---|
| JP | 2018-004514 A | 1/2018 |
| KR | 10-2013-0026502 A | 3/2013 |
| KR | 10-1642473 B1 | 7/2016 |
| KR | 10-2018-0036757 A | 4/2018 |
| KR | 10-2019-0136650 A | 12/2019 |
| KR | 10-2124764 B1 | 7/2020 |

* cited by examiner

Connection structure of reflection mirror and rotary motor
Both circular and polygonal structures are possible

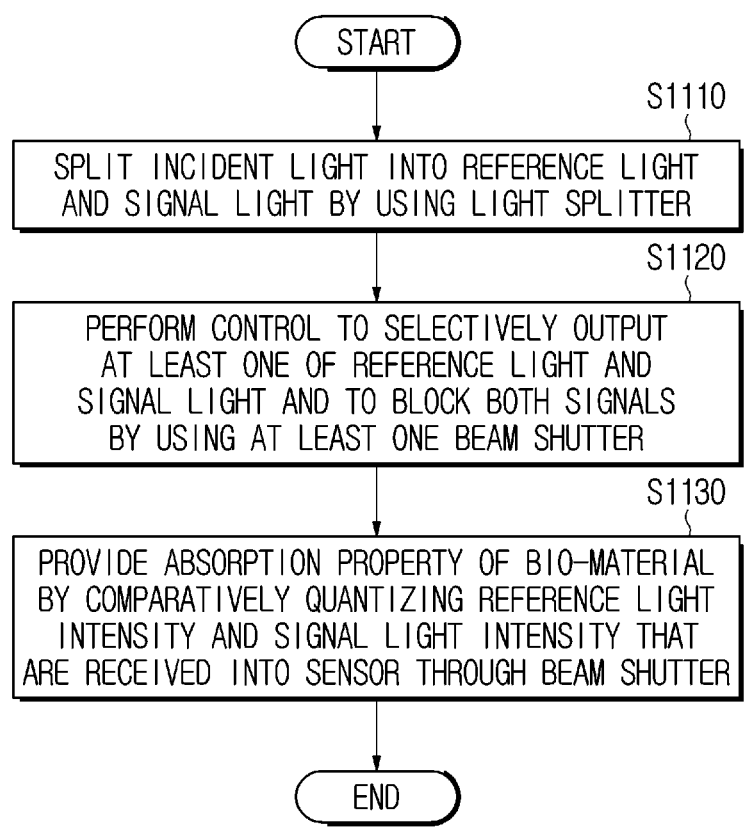

SPECTRAL DEVICE WITH ENHANCED STABILITY OF OPTICAL SENSOR AND OPERATING METHOD THEREOF

CROSS REFERENCE TO RELATED APPLICATIONS

The present application claims priority to Korean Patent Application Nos. 10-2021-0188907, filed Dec. 27, 2021, and 10-2022-0127649, filed Oct. 6, 2022, the entire contents of which are incorporated herein for all purposes by this reference.

BACKGROUND OF THE INVENTION

1. Field of the Invention

The present disclosure relates to a spectral device with enhanced stability of optical sensor and an operating method of the device and, more particularly, to a spectral device capable of separating a reference light and a signal light, of measuring the lights by a single sensor, and thus of enhancing the accuracy of equipment, and an operating method for the device.

2. Description of Related Art

A spectral device, which is used in an optical system for measuring the properties of absorption, transmission and emission after absorption of a bio-material, basically has a cross-shaped (+) optical layout structure like a Michelson interferometer structure and normally uses one optical sensor. Thanks to its advantages including a simple structure, a spectral device is widely used in various spectrometric instruments for analyzing biological, medical and other material properties.

The principle may be described as follows. A light source with an absorption characteristic, with which a bio-material reacts, is prepared and transmitted toward a sample. The light source thus incident is split into two beams usually by a 50:50 beam splitter, and one of the two beams is designated as a reference light signal and is used as a reference beam for quantizing the absorption rate of a bio-material while correcting the fluctuation of light output. In addition, the remaining half is designated as a signal beam, and a bio-material sample is irradiated by the signal beam. Herein, the reference beam and the signal beam are reflected from a reflection mirror and a biosample respectively and enters an optical sensor through the beam splitter again. For this reason, an amount of original light incident to the sensor is a quarter (¼) of an amount of initial incident light. The size of a signal is reduced as the signal enters a light splitter again, and when a signal penetrates an additional optical system, an unwanted noise signal is further generated. Furthermore, as the signal intensity decreases, the signal is drowned by a background noise signal and becomes impossible to accurately measure.

A technique, which is used to maintain the original size of a signal, completely separates beam paths to prevent two beams split by a light splitter from entering a sensor through the light splitter again and measures clearer signals respectively by using two sensors, but in this case, an additional optical path should be configured so that the size of a system becomes relatively large, and the usage of two sensors brings a further cumbersome task of compensating for a difference of reactions between the sensors through calibration. In addition, as the two sensors have different degradation rates of characteristics over time, it is necessary to check and compensate for the difference at a regular basis.

Furthermore, in the case of an existing technique, since a light sensor keeps exposed to a light source, the background noise level of a signal from the sensor becomes different as the measurement time becomes longer, and this problem often makes it difficult to ensure reliable measurements.

SUMMARY

The present disclosure is technically directed to provide a spectral device capable of separating a reference light and a signal light, of measuring the lights by a single sensor, and thus of enhancing the accuracy of equipment, and an operating method for the device.

Other objects and advantages of the present invention will become apparent from the description below and will be clearly understood through embodiments. In addition, it will be easily understood that the objects and advantages of the present disclosure may be realized by means of the appended claims and a combination thereof.

Disclosed herein a spectral device with enhanced stability of optical sensor and an operating method of the device. According to an embodiment of the present disclosure, there is provided a spectral device comprising: a light splitter configured to split an incident light into a reference light and a signal light; at least one beam shutter configured to perform control for selectively outputting at least one of the reference light and the signal light and for blocking the two signals together; and a controller configured to provide an absorption property of a bio-material by comparatively quantizing an intensity of the reference light and an intensity of the signal light, which are received into a sensor through the beam shutter.

According to the embodiment of the present disclosure, wherein the at least one beam shutter comprises a physical shutter that is mounted on a rail capable of linear movement and is capable of iteratively moving a specific distance.

According to the embodiment of the present disclosure, wherein the physical shutter has a hole of a beam block, which the signal light passes through, and a hole of a beam block, which the reference light passes through, formed asymmetrically with respect to a center line of the physical shutter.

According to the embodiment of the present disclosure, wherein the at least one beam shutter comprises a rotary shutter with a disc blade structure.

According to the embodiment of the present disclosure, wherein the rotary shutter selectively outputs at least one light of the reference light and the signal light, outputs both the reference light and the signal light, or blocks both the reference light and the signal light.

According to the embodiment of the present disclosure, wherein the at least one beam shutter comprises: a first rotary shutter configured to control an output of the reference light; and a second rotary shutter configured to control an output of the signal light.

According to the embodiment of the present disclosure, wherein the first rotary shutter and the second rotary shutter are shutters with a programmed alternate open/close function that makes them operate sequentially.

According to the embodiment of the present disclosure, wherein the at least one beam shutter is further configured to completely block a light from entering the sensor by blocking both a beam path of the reference light and a beam path of the signal light for a predetermined time.

According to another embodiment of the present disclosure, there is provided a spectral device comprising: a rotary optical switch that is formed as a polygonal structure, has a reflection means on at least one face of the polygonal structure, and uses the reflection means to provide an incident light as a beam path of a reference light or a beam path of a signal light; and a controller configured to provide an absorption property of a bio-material by comparatively quantizing an intensity of the reference light and an intensity of the signal light, which are received into a sensor through the rotary optical switch.

According to another embodiment of the present disclosure, the spectral device further comprising a reflection mirror at each point where the incident light is reflected by the reflection means, wherein the reflection mirror provides the incident light as a beam path of the reference light or a beam path of the signal light.

According to another embodiment of the present disclosure, wherein the rotary optical switch replaces a light splitter through the reflection means.

According to another embodiment of the present disclosure, there is provided a method for operating a spectral device. The method comprising: splitting, by a light splitter, an incident light into a reference light and a signal light; performing, by at least one beam shutter, control for selectively outputting at least one of the reference light and the signal light and for blocking the two signals together; and providing an absorption property of a bio-material by comparatively quantizing an intensity of the reference light and an intensity of the signal light, which are received into a sensor through the at least one beam shutter.

The features briefly summarized above with respect to the present disclosure are merely exemplary aspects of the detailed description below of the present disclosure, and do not limit the scope of the present disclosure.

The present disclosure may provide a spectral device capable of separating a reference light and a signal light, of measuring the lights by a single sensor, and thus of enhancing the accuracy of equipment, and an operating method for the device.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 11 shows an operation flowchart of an operating method for a spectral device according to another embodiment of the present disclosure.

DETAILED DESCRIPTION

Figure 1:
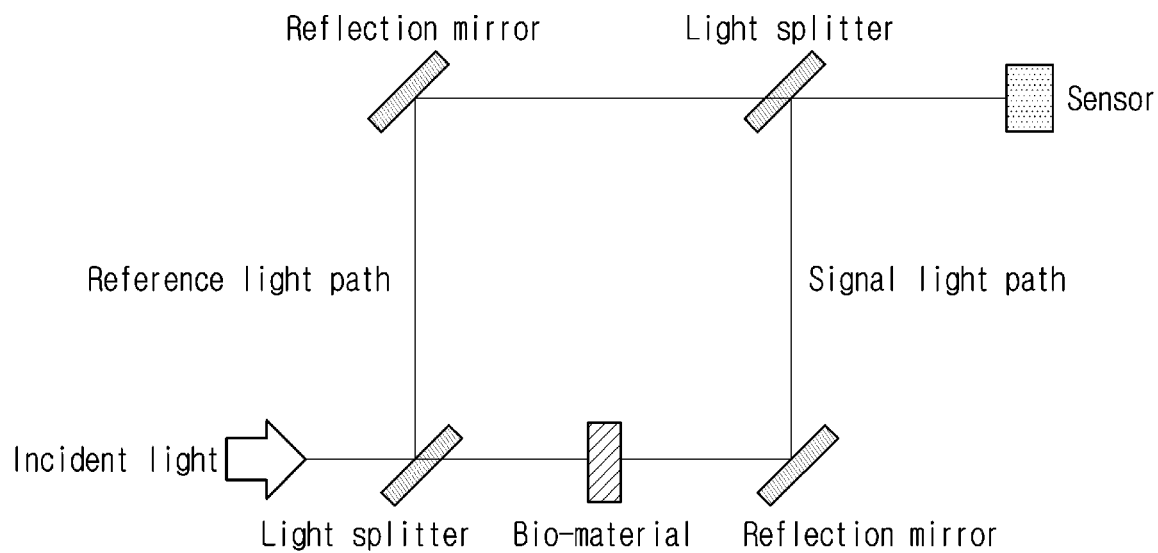
FIG. 1 shows a conventional spectral technology structure for biosensing according to an embodiment.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

In the present document, such phrases as 'A or B', 'at least one of A and B', 'at least one of A or B', 'A, B or C', 'at least one of A, B and C' and 'at least one of A, B or C' may respectively include any one of items listed together in a corresponding phrase among those phrases or any possible combination thereof.

A single sensor-based optical system for measuring a bio-material basically has a cross-shaped (+) optical layout structure like a Michelson interferometer structure. A 50:50 beam splitter (or light splitter) is normally used for splitting a light into two beams, and one of the two beams is used as a reference light and the other one is designated as a signal light with which a sample is irradiated. However, since the light enters a single optical sensor by way of the beam splitter again, an initial amount of the incident light is reduced to a quarter when the light is incident to the sensor. In order to overcome this problem, there is a structure that makes two beams from a light splitter individually incident to two sensors.

FIG. 1 shows a spectral technology structure for biosensing according to a conventional embodiment, that is, a spectral device structure of a Michaelson structure that is frequently used to measure the properties of light absorption, transmission and luminescence after absorption in bio-materials or matters.

Generally, when a single sensor is used, a layout structure may be described as in FIG. 1, and since an incident light needs to penetrate a beam splitter twice due to a structural characteristic, the initial intensity of the light is reduced to a quarter when the light reaches the sensor. In the structure, as the intensity of a signal light is halved after penetrating a bio-material, if an external noise signal is mixed, it is difficult to accurately detect a change of signal. To overcome this problem, a technique of using two sensors is used to prevent a signal light and a reference light from a beam splitter the second time, and a corresponding structure is illustrated in FIG. 2.

Figure 2:
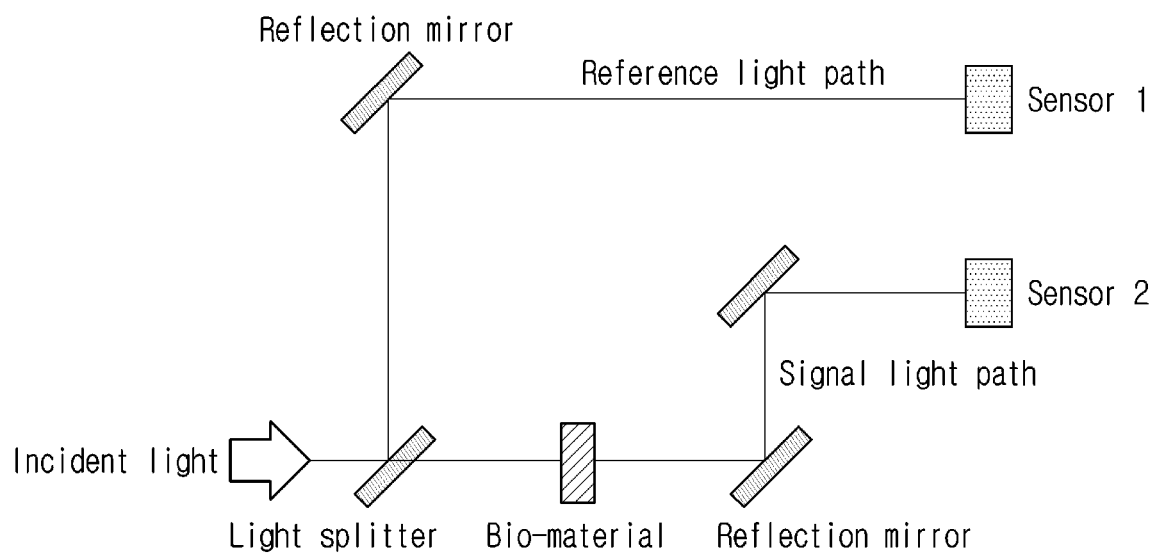
FIG. 2 shows a conventional spectral technology structure for biosensing according to another embodiment.

In the case of FIG. 2, as compared with that of FIG. 1, the advantage is that the intensity of a signal light is not halved after penetrating a bio-material, but an additional optical system is needed, and even when two sensors made by a same manufacturer are used, the sensors have different properties so that calibration of sensitivity should be performed between the sensors, which is obviously a disadvantage. Furthermore, since different sensors are used, as the usage time of the device increases, the sensors show a different degree of aging and thus should always be calibrated with each other at a regular basis.

The methods of FIG. 1 and FIG. 2 have respective advantages and disadvantages. The biggest problem is that, since both layouts make an optical sensor keep exposed to an incident light, the background noise level of a sensor continuously changes over time and thus a numerical value read in the sensor constantly changes, which lowers the reliability of a measuring instrument. In order to overcome this problem, an incident light is regularly on/off or a sensor is switched on/off, but both methods require a warm-up time for reaching a stable operation state, which is not suitable for a situation that requires continuous measurement.

In the embodiments of the present disclosure, the main idea is to provide a spectral device that has an optical switch with a specific shape installed in a cross-shaped (+) structure of an existing light spectral system, measures a reference light and a signal light sequentially by a single sensor, blocks the two signals simultaneously during a switching process to prevent a background noise level of the optical sensor from increasing, and thus ensures the sensitivity characteristic of the sensor at a stable basis.

Furthermore, according to embodiments of the present disclosure, when a rotary reflection mirror is used to solve the problem of an ultimate decrease to a quarter of the intensity of an incident light in an existing structure using a single optical sensor, it is possible to provide a new form of spectral device that uses no light splitter, utilizes 100% of the light amount and still includes the above-described function of optical switch.

Figure 3:
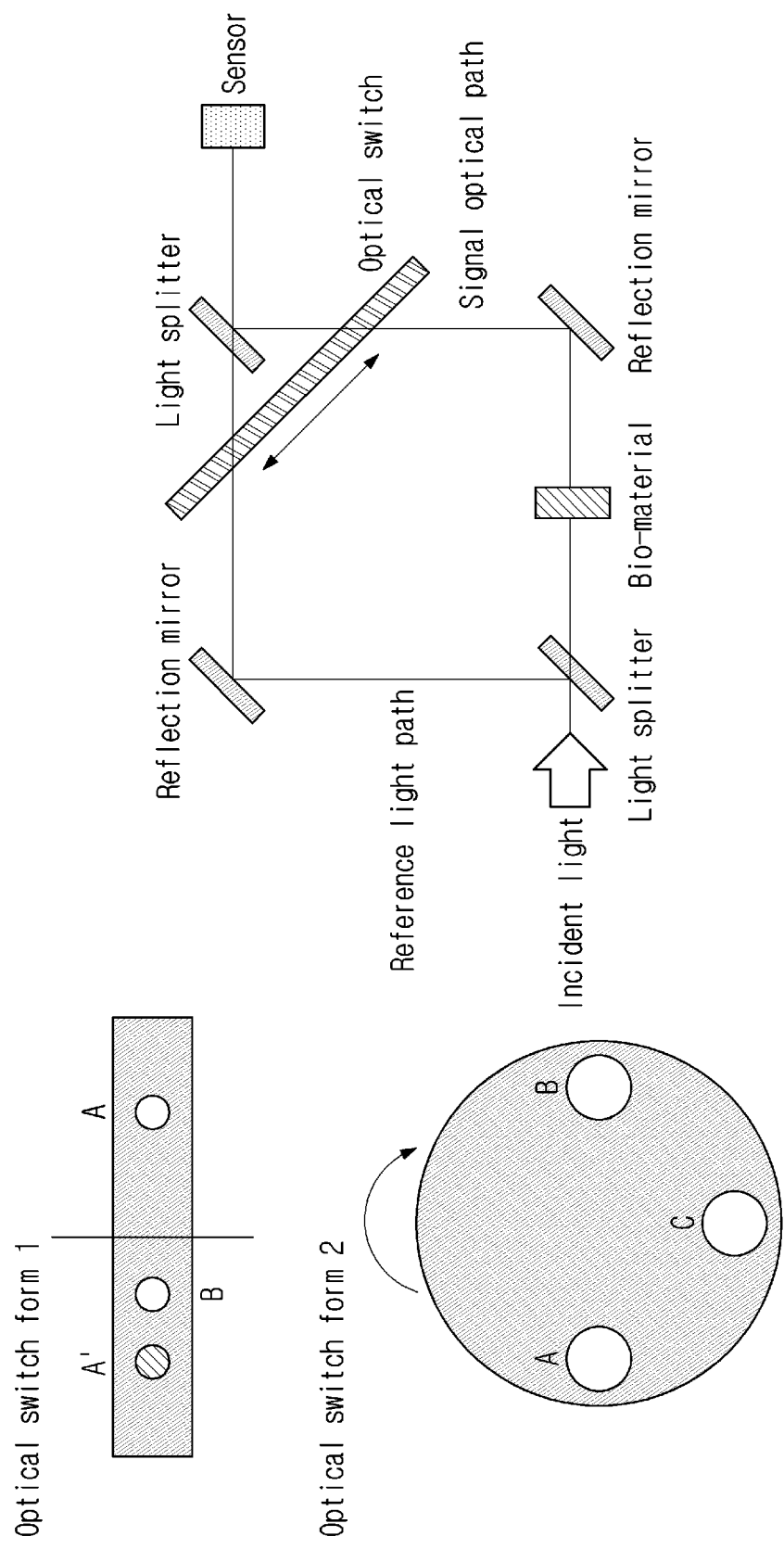
FIG. 3 shows an example structure with a designed optical switch inserted into an existing spectral technology structure for biosensing.

FIG. 3 shows an example structure with a designed optical switch inserted into an existing spectral technology structure for biosensing.

As illustrated in FIG. 3, an optical switch form 1 is designed to let only a light corresponding to a beam path pass through a hole, and the optical switch form 1 is made by installing a physical beam block on a linear motor or voice coil and by boring holes like A and B. In the entire beam block, the hole A has its corresponding position A', but when a hole is bored at position B not the position A', the optical switch moves from side to side to let a signal light and a reference light sequentially pass through the hole, and the entire beam is blocked in the other sections, so that the sensor can be prevented from being constantly exposed to an unnecessary light and the background noise level of the sensor can be prevented from changing. The optical switch form 1 with linear movement may be fabricated, like an optical switch form 2, as a structure in which a disc-shaped beam shutter is made on a rotary motor, and holes like A, B and C are bored to let a beam pass through them. Since such an optical switch has a repetition cycle function as a type of trigger, an unnecessary signal noise may be blocked and the precision may be relatively increased.

Figure 4:
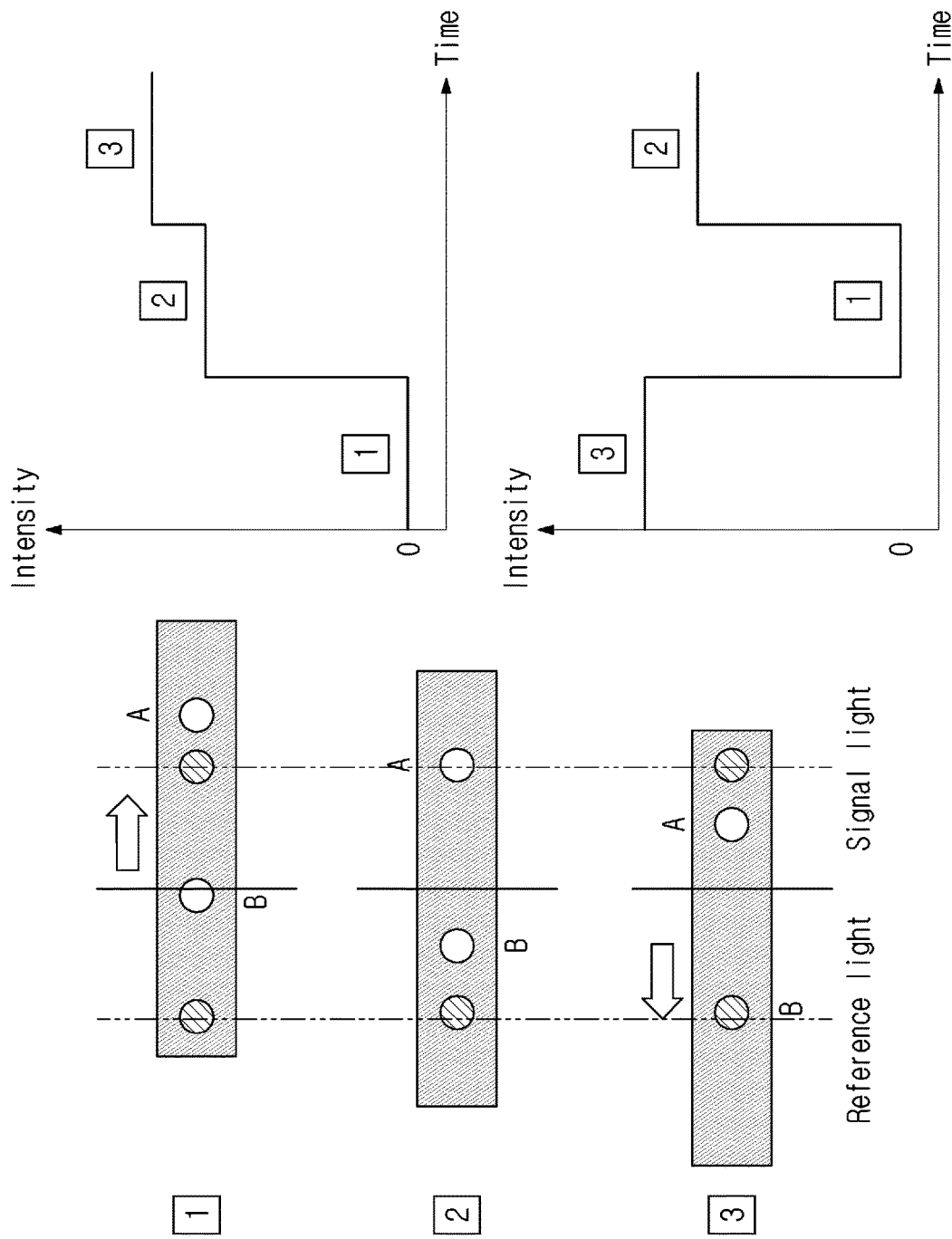
FIG. 4 shows a change of an optical signal according to a switch movement when an optical switch form 1 moving in a straight line is used.

FIG. 4 shows a change of an optical signal according to a switch movement, when an optical switch form 1 moving in a straight line is used, and this view shows a graphical representation of a change of voltage or current value measured at a sensor according to whether or not a signal light and a reference light pass a hole of the linear beam block of FIG. 3 moving side from side.

As illustrated in FIG. 4, since the sensor is always in a state where the amount of incident light is zero (0), the sensor may be prevented from continuous exposure and thus keep a certain background noise level all the time. In addition, when 2 (signal light intensity) and 3 (reference light intensity) measured herein are comparatively quantized, the measurement precision may be enhanced. That is, in the case of 1, both a reference light and a signal light are blocked to make the amount of light incident to the sensor 0, in the case of 2, only a signal light is controlled to be incident to the sensor, in the case of 3, only a reference light is controlled to be incident to the sensor, and thus the light intensity of 2 and the light intensity of 3 may be comparatively quantized.

Herein, in the beam shutter of FIG. 4, the boles of a beam block, which a signal light and a reference light pass through, may be asymmetrically formed based on the center line.

Figure 5:
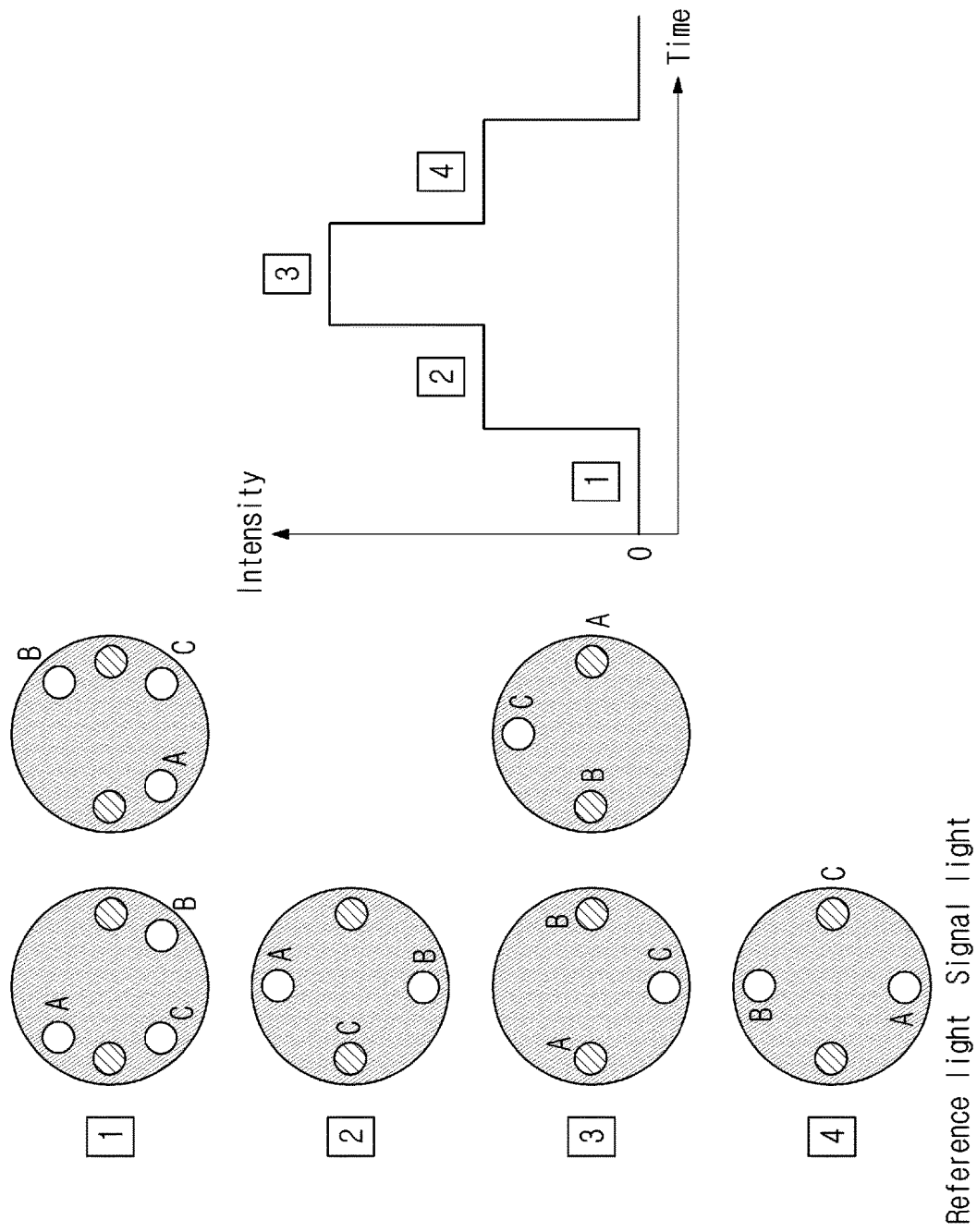
FIG. 5 shows a change of an optical signal according to an optical switch arrangement when a rotating optical switch form 2 is used.

FIG. 5 shows a change of an optical signal according to an optical switch arrangement, when an optical switch form 2, which is rotary, is used, and this view shows a graphical representation of a change of voltage or current value measured at a sensor according to whether or not a signal light and a reference light pass a hole of a rotary beam block that is used instead of the linear beam block of FIG. 3.

Unlike in FIG. 4, the case of FIG. 5 has the advantage that, as there is a section where a signal light and a reference light pass through at the same time and this enables an overall size of light signal incident to a sensor to be identified, the intensity of an initial incident light can be identified and adjusted to make no measurement in a state near a section where the sensor is saturated. In the graph, as 4 (signal light intensity) and 2 (reference light intensity) are comparatively quantized, the absorption property of a bio-material may be identified. As compared with FIG. 4, the case of FIG. 5 has the following advantages. Rotation may be performed a uniform speed, which makes it possible to obtain a clearer and more uniform signal, and since increasing a rotary speed is easier than enhancing a linear speed from the structural perspective, a measurement condition may be set at various speeds. That is, in the case of 1, since both a signal light and a reference light are blocked so that the sensor is always in a state where the amount of incident light is zero (0), the sensor may be prevented from continuous exposure and thus keep a certain background noise level all the time. In addition, in the case of 2, only a reference light is controlled to be incident to the sensor, in the case of 4, only a signal light is controlled to be incident to the sensor, and thus the light intensity of 2 and the light intensity of 4 may be comparatively quantized. In the case of 3, as both a signal light and a reference light are allowed to pass, the size of an overall signal incident to the sensor may be identified.

Figure 6:
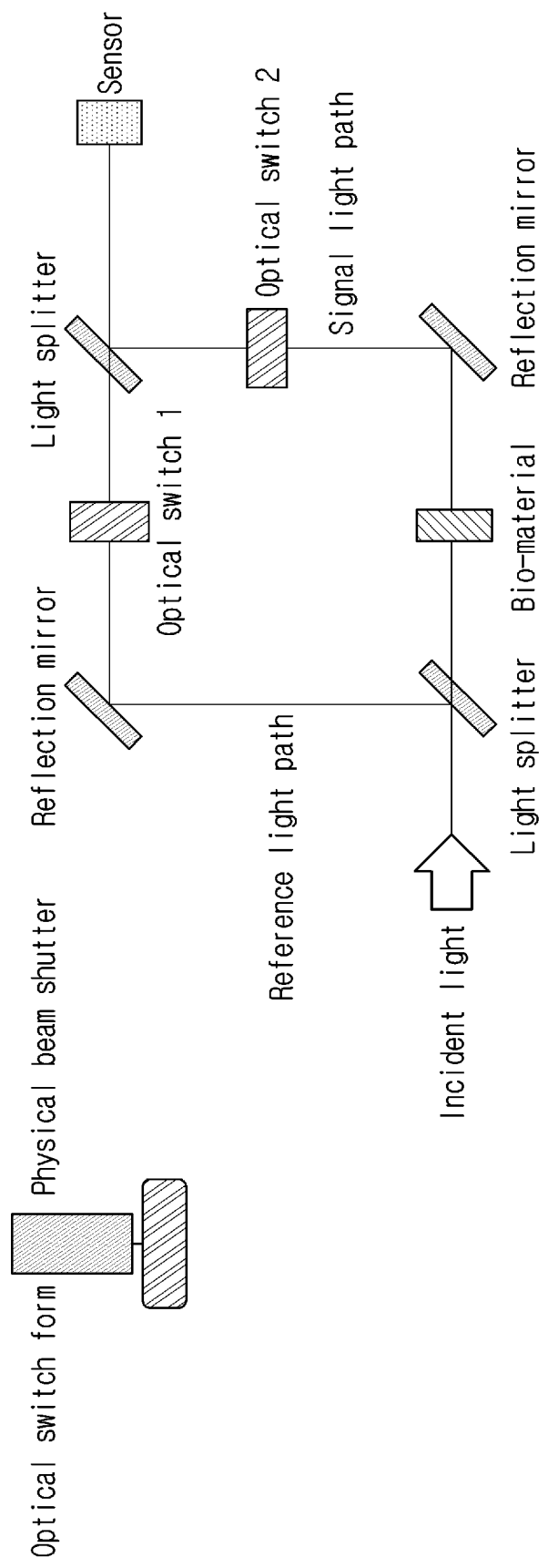
FIG. 6 shows an example structure of a spectral device when two optical switches are used.

FIG. 6 shows an example structure of a spectral device when two optical switches are used.

In FIG. 4, the moving speed and distance of a linear motor have a great effect on the cost of an overall system, and the backlash of the motor, which occurs due to the necessary change of moving direction at both ends, may cause a time-location displacement problem of a measured signal. The case of FIG. 5 may reduce the cost in comparison with the structure of FIG. 4 in virtue of a less expensive rotary motor, but there is still a disadvantage that an overall system requires a large space because the rotary shutter makes it difficult to reduce the size of a basic structure. These two disadvantages can be overcome by the structure of FIG. 6. That is, as illustrated in FIG. 6, a spectral device according to an embodiment of the present disclosure may not only reduce cost but also ensure the advantage of a compact structure by programming optical switches 1 and 2 to sequentially rotate only at 90 degrees. That is, the on/off control of two physical beam shutters enables a spectral device with a compact structure to be provided at lower cost.

Figure 7:
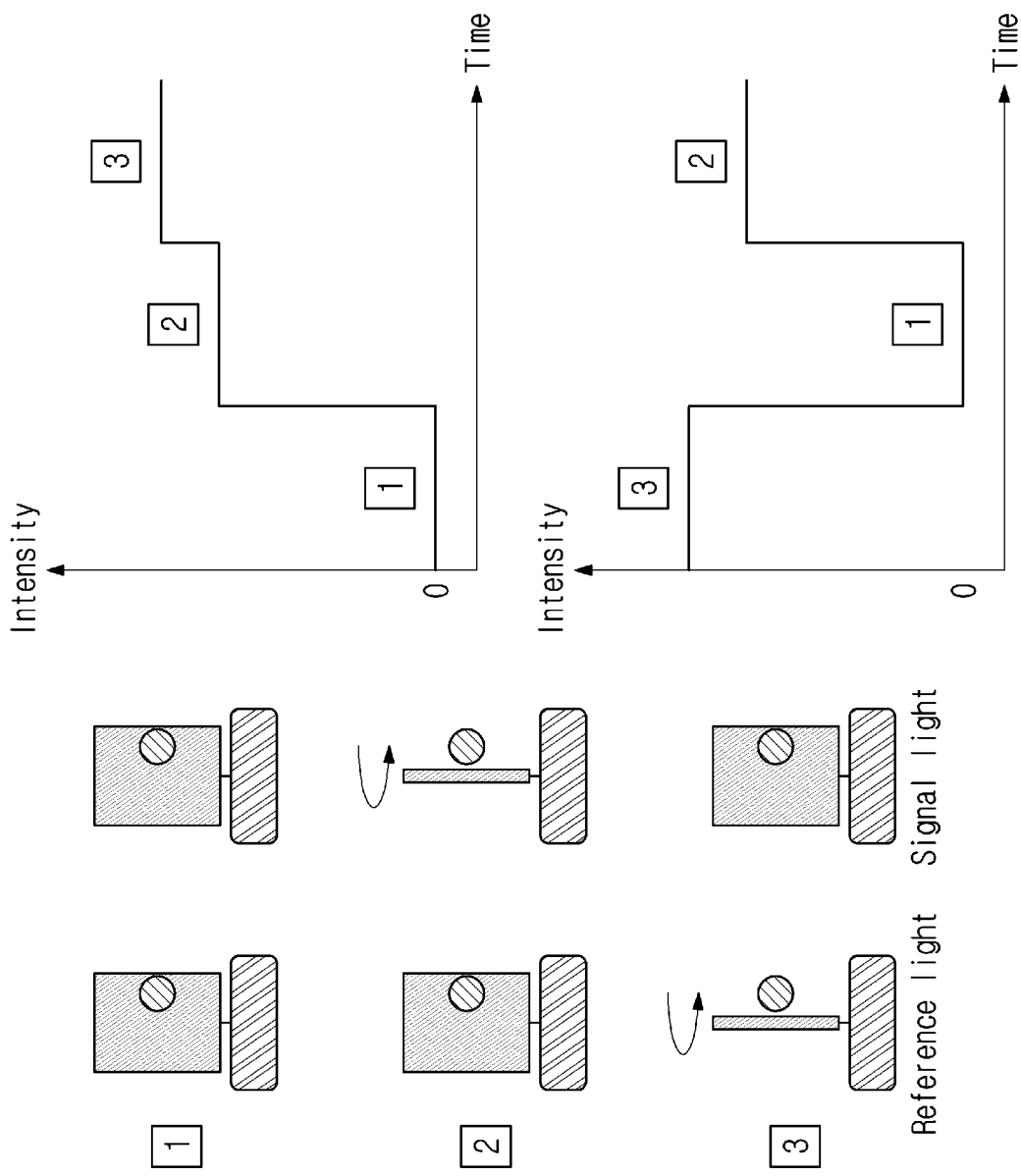
FIG. 7 shows a change of an optical signal according to a switch movement when two optical switches are used.

FIG. 7 shows a change of an optical signal according to a switch movement when two optical switches are used.

As illustrated in FIG. 7, as can be known from a change of an optical signal while two optical switches operate in the order of 1, 2 and 3, in the case of 1, since both a signal light and a reference light are blocked so that a sensor is always in a state where the amount of incident light is zero (0), the sensor may be prevented from continuous exposure and thus keep a certain background noise level all the time. In addition, in the case of 2, only a signal light is controlled to be incident to the sensor, in the case of 3, only a reference light is controlled to be incident to the sensor, and thus the light intensity of 2 and the light intensity of 3 may be comparatively quantized. Of course, although not illustrated in FIG. 7, when both the two optical switches are open, a maximum amount of light may also be identified as in the case of 3 in FIG. 5.

Figure 8:
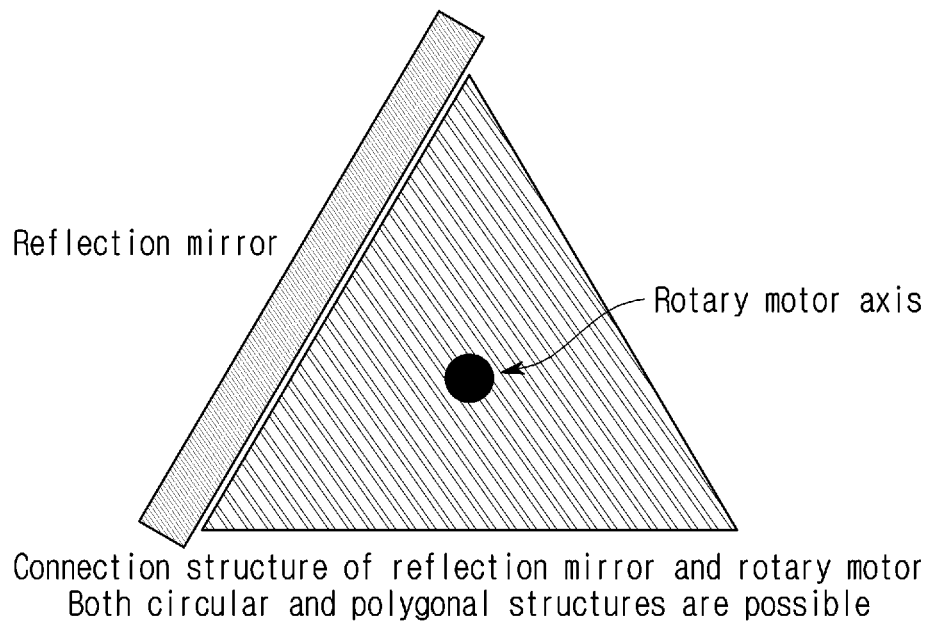
FIG. 8 shows a mount configuration for connecting an optical mirror and a rotary motor that replace a light splitter.

FIG. 8 shows a mount configuration for connecting an optical mirror and a rotary motor that replace a light splitter, and the view shows a structural view of main optical components for configuring a new form of spectral device that can maintain the original intensity of incident light by not using any light splitter unlike an existing spectral device.

As illustrated in FIG. 8, in a circular or polygonal structure mounted on a rotary motor, only one face is equipped or coated with a reflection means, for example, a highly reflective mirror, and the other face is a blade-type beam dumper or is processed to minimize reflection, and this structure may replace a light splitter. FIG. 8 illustrates a triangular structure as an example but is not restricted or limited thereto, and any polygonal structure may be included.

Herein, a metal-coated mirror or a dielectric-coated mirror may be used as a reflection mirror, the face of a structure itself may be coated with metal or dielectric, and the remaining faces may be coated or be equipped with a structure for minimizing optical reflection. This is merely an example, and a plurality of mirrors may be attached to the structure.

Figure 9:
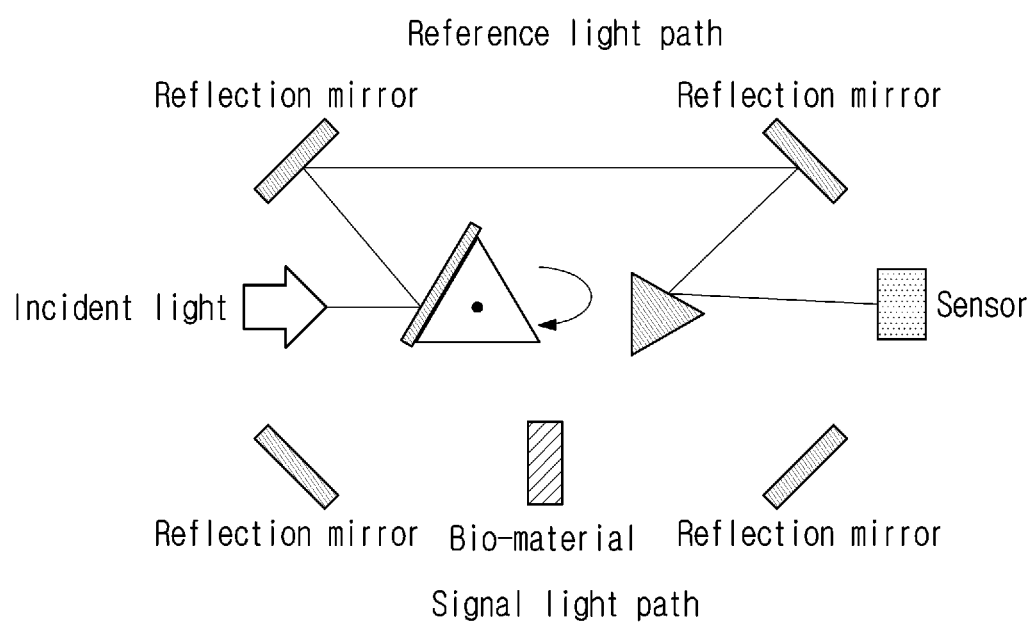
FIG. 9 shows another example structure of a spectral device with a rotary optical mirror that replaces a light splitter.

FIG. 9 shows another example structure of a spectral device with a rotary optical mirror that replaces a light splitter.

As illustrated in FIG. 9, when the rotary optical switch of FIG. 8 is placed towards an incident, as for a beam reflecting from a reflection mirror of the rotary optical switch, in the case of 0 degree<incidence angle<45 degrees and 0 degree<incidence angle<−45 degrees with a reference point of 0 degree being the vertical angle of the mirror, the incident light may be sent more efficiently to a reference light path and a signal light path. As the rotary optical switch illustrated in FIG. 8 rotates at a constant speed, a beam path, which is incident to the sensor through reflection mirrors, is formed only for a short time, and all the remaining beams become a beam block accordingly. That is, since the rotary optical switch of FIG. 8 replaces a light splitter, a reference light is sent to a reference light path and a signal light is sent to a signal light path, and the two beams may be blocked from being incident to the sensor during the remaining time.

FIG. 10A to FIG. 10D show a change of an optical signal according to a mirror arrangement that changes according to the rotation of a rotary optical mirror replacing a light splitter, and the views are schematic diagrams of graphs for a change of an optical signal according to a position of an optical mirror attached to the rotary optical switch of FIG. 8 that is rotating.

Figure 10A:
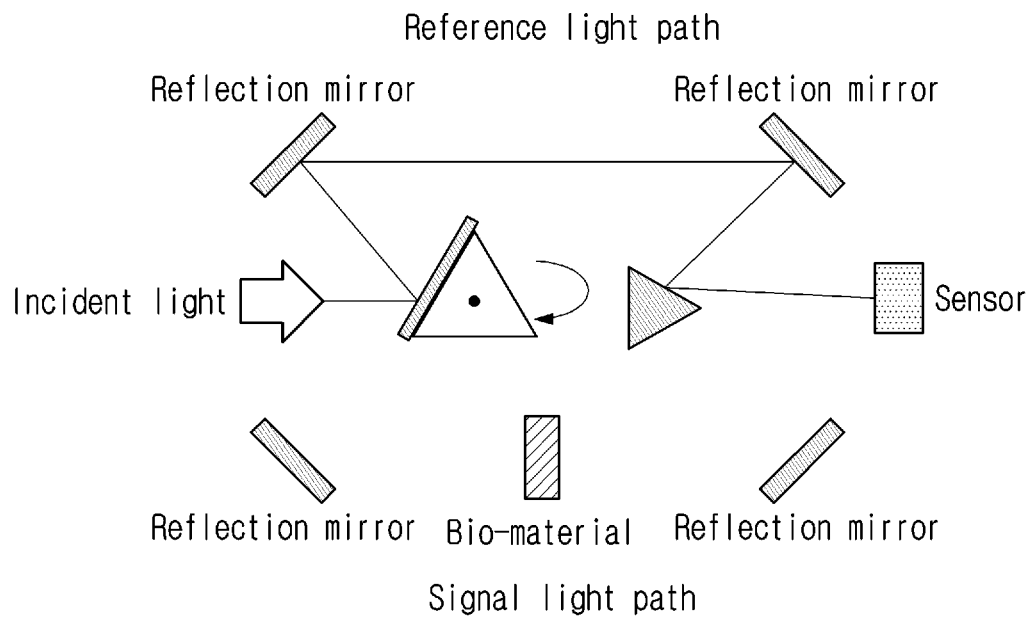
FIG. 10A to FIG. 10D show a change of an optical signal according to a mirror arrangement that changes according to the rotation of a rotary optical mirror replacing a light splitter.
Figure 10B:
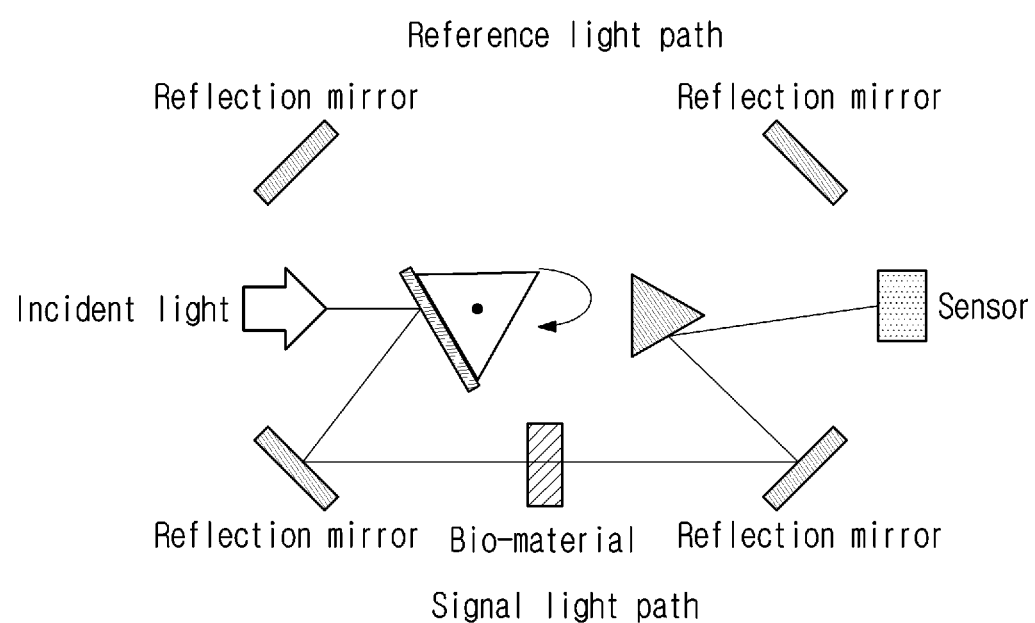
Figure 10C:
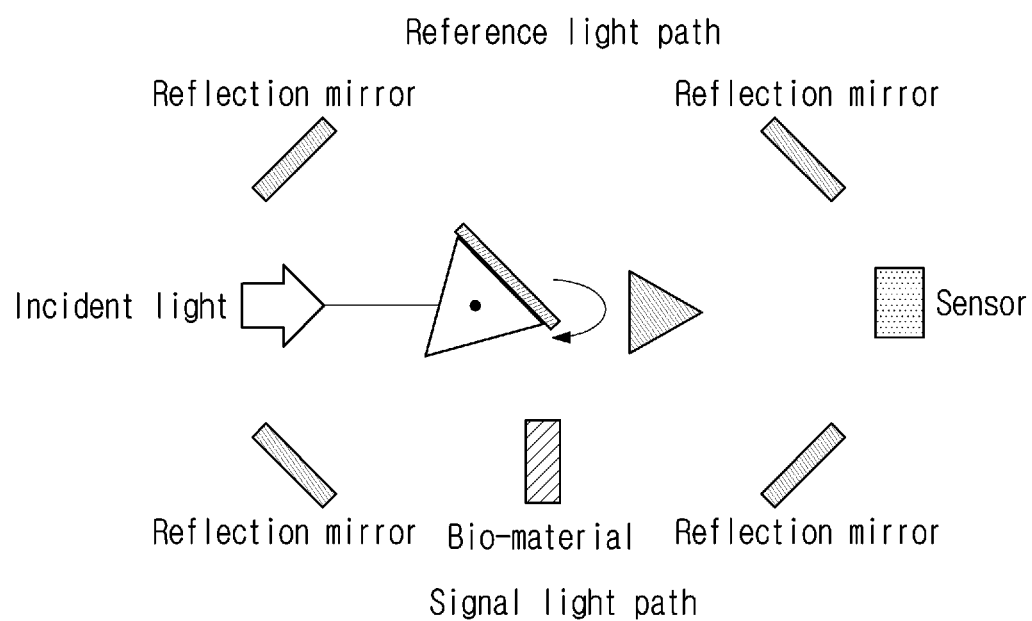
Figure 10D:
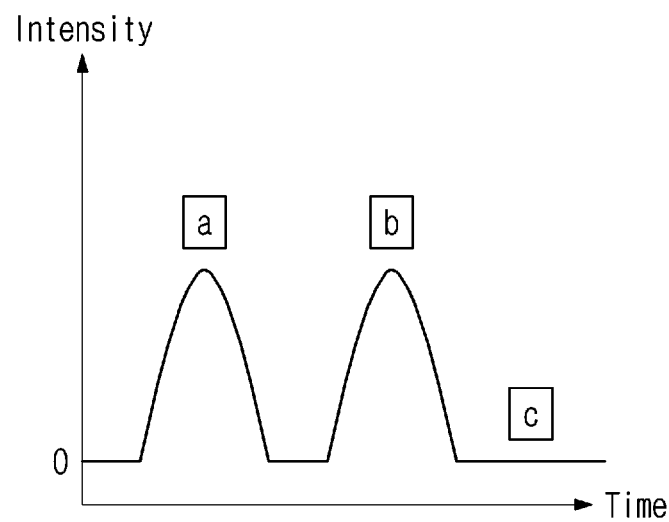

As shown in FIG. 10, except the cases in which an incident light follows a reference light path (FIG. 10A) and an incident light follows a signal light path (FIG. 10B), in all the other situations like the case of FIG. 10C, a signal cannot reach the sensor so that the signal intensity seems to be 0. Herein, as illustrated in FIG. 10D, since only the peak voltage or current values of measured signals a and b need to be read and compared, not only a signal analysis is very easy, but also the sensor may be prevented from being continuously exposed to the incident light.

Thus, in a spectral device according to embodiments of the present disclosure, as an additional optical shutter is installed in an existing optical measurement system for bio sensor, a reference light and a signal light may be separated and be measured by a single sensor, and it is also possible to solve the problem of degraded precision caused by an increasing background noise level that is attributed to an incident light during a long-time operation of the sensor.

In addition, a spectral device according to embodiments of the present disclosure may sequentially measure a reference light and a signal light by using an optical switch-type beam shutter in a single sensor and thus stably measure an individual signal, and when the optical switch operates fast and functions as a trigger signal to filter the remaining signals except at a corresponding frequency in a programmable manner, obtain a clear signal.

In addition, a spectral device according to embodiments of the present disclosure may block all the beam paths of a reference signal and a signal light for a predetermined time through an optical switch-type beam shutter, so that the light may be completely blocked from entering a sensor and the sensor may be prevented from continuously being exposed to light and the background noise level itself may be prevented from increasing, thereby preventing the size of a signal from changing over time, which may also lower an error rate.

In addition, as the existing technique requires a structure with a light splitter as an indispensable component, when the amount of light to be incident on a bio sample should be increased, the only solution is to increase the intensity of a basic light source, and this has a disadvantage that an overall measuring instrument is heated by the heat from the light source. On the other hand, in the case of a spectral device according to embodiments of the present disclosure, when a structure with a reflection mirror and a rotary motor is applied the spectral device, no light splitter is needed so that, as compared with the existing system, the output of a light source may be doubled and the amount of light entering a sensor may increase four times.

In addition, in a spectral device according to embodiments of the present disclosure, as for a beam reflected from a rotary mirror, only a light accurately corresponding to a designed optical axis reaches a sensor, and for this reason, if a long beam path is applied, an unnecessary light may be blocked by a beam block.

Although not illustrated in the spectral devices of FIG. 1 to FIG. 10, a controller may further be included which compares and quantizes the intensity of a reference signal and that of a signal light, which are received by a sensor, and provides an absorption property of a bio-material. Herein, the controller may control at least one beam shutter, and every means operated by control, among constituent means of a spectral device, may be controlled by the controller.

Furthermore, a spectral device may include any necessary constituent means like a light source, a reflection mirror, a lens for bio-sample concentration and collimation, and a single optical sensor.

Herein, the source used for the spectral device may include various light sources like laser, LD, LED, and white light.

FIG. 11 shows an operation flowchart of an operating method for a spectral device according to another embodiment of the present disclosure, and this operation flowchart shows an operating method for the spectral devices of FIG. 1 to FIG. 10.

Referring to FIG. 11, in a method for operating a spectral device according to another embodiment of the present disclosure, an incident light is split into a reference light and a signal light by a light splitter, and at least one beam shutter is used to perform control for selectively outputting at least one of the reference light and the signal light and for blocking both the signals (S1110, S1120).

According to an embodiment, at step S1120, the control for selectively outputting at least one of the reference light and the signal light and for blocking both the signals may be performed by using a physical shutter that is mounted on a rail capable of linear movement and is capable of iteratively moving a specific distance.

According to an embodiment, at step S1120, the control for selectively outputting at least one of the reference light and the signal light and for blocking both the signals may be performed by using a rotary shutter with a disc blade structure.

When the reference light and the signal light are received, by the control of step S1120, into the sensor through at least one beam shutter, the intensity of the reference light and the intensity of the signal light, which are received into the sensor, are comparatively quantized to provide an absorption property of a bio-material (S1130).

Although not described in the method of FIG. 11, a method according to another embodiment of the present disclosure may include all the contents described in the devices of FIG. 1 to FIG. 10, which is apparent to those who have skill in the art.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

What is claimed is:

1. A spectral device comprising:
   a light splitter configured to split an incident light into a reference light and a signal light;
   one beam shutter configured to perform control for selectively outputting either the reference light or the signal light and for blocking the two lights together; and
   a controller configured to provide an absorption property of a bio-material by comparatively quantizing an intensity of the reference light and an intensity of the signal light, which are received into a sensor through the beam shutter,
   wherein the beam shutter is further configured to completely block a light from entering the sensor by blocking both a beam path of the reference light and a beam path of the signal light for a predetermined time,
   wherein the beam shutter comprises a physical shutter that is mounted on a rail capable of linear movement and is capable of iteratively moving a specific distance, and
   wherein the physical shutter has a hole of a beam block, which the signal light passes through, and a hole of a beam block, which the reference light passes through, formed asymmetrically with respect to a center line of the physical shutter, wherein the physical shutter moves linearly from side to side, allowing the signal light and the reference light to sequentially pass through their corresponding holes.

2. A method for operating a spectral device, the method comprising:
   splitting, by a light splitter, an incident light into a reference light and a signal light;
   performing, by one beam shutter, control for selectively outputting either the reference light or the signal light and for blocking the two lights together; and
   providing an absorption property of a bio-material by comparatively quantizing an intensity of the reference light and an intensity of the signal light, which are received into a sensor through the beam shutter,
   wherein the beam shutter is further configured to completely block a light from entering the sensor by blocking both a beam path of the reference light and a beam path of the signal light for a predetermined time,
   wherein the beam shutter comprises a physical shutter that is mounted on a rail capable of linear movement and is capable of iteratively moving a specific distance, and
   wherein the physical shutter has a hole of a beam block, which the signal light passes through, and a hole of a beam block, which the reference light passes through, formed asymmetrically with respect to a center line of the physical shutter, wherein the physical shutter moves linearly from side to side, allowing the signal light and the reference light to sequentially pass through their corresponding holes.

3. The method of claim 2, wherein the performing of the control performs control to selectively output either the reference light or the signal light and to block the two lights together by using the physical shutter.

\* \* \* \* \*